_Patented Dec. 2, 1941_

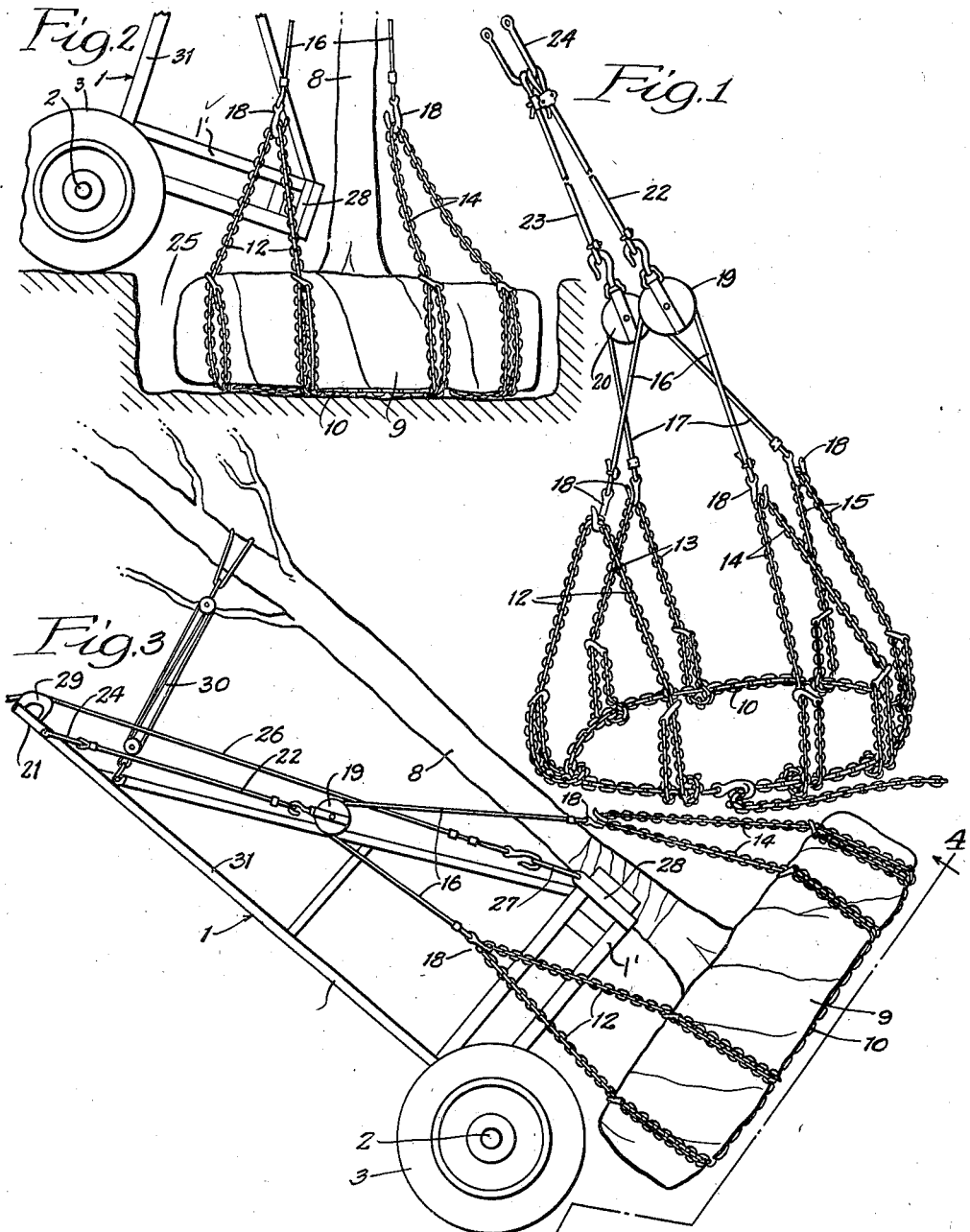

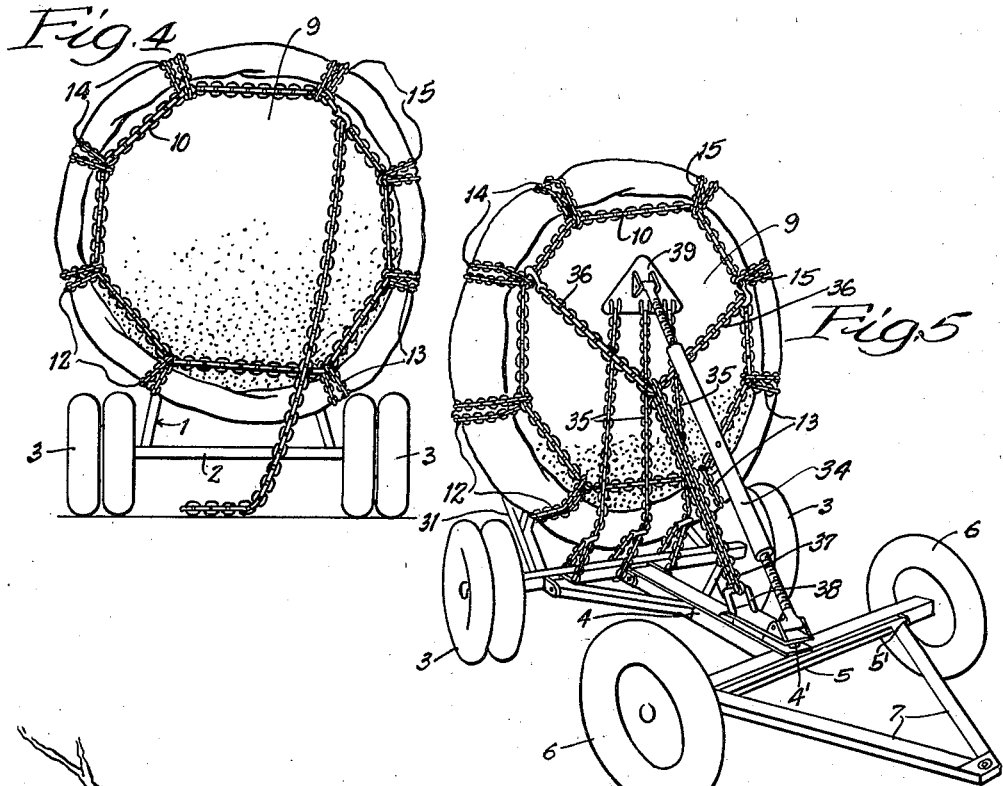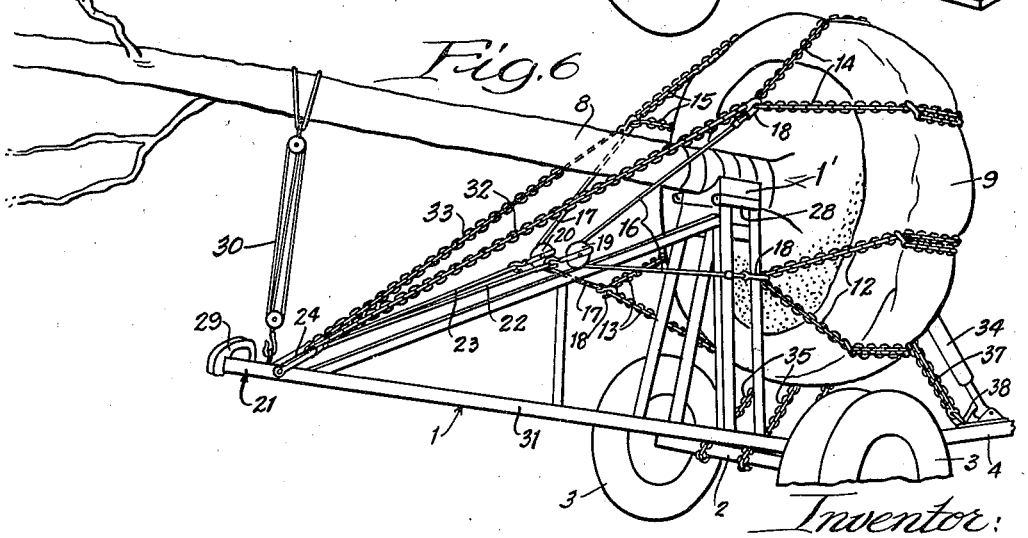

2,264,571

UNITED STATES PATENT OFFICE 2,264,571

TREE MOVER

Wallace L. Jeffrey, Fulton, Mo.

Application January 31, 1940, Serial No. 316,493

7 Claims. (Cl. 214—3)

This invention relates to improvements in the tree moving art and more particularly to means for withdrawing the rootball from the ground and loading it on the mover.

The main objects of this invention are to provide an improved apparatus for withdrawing a tree ball from the ground and loading it on the mover; to provide a device of this character which will minimize the time required for such removal; to provide a device of this character which shall be operative on a tree growing in sandy soil as well as ordinary soil and clay; to provide a device of this character which shall eliminate the employment of the usual eye bolts and bearing plates such as were essential heretofore; to provide a self-adjusting system of flexible lift members in a device of this character; and to provide a device of this character which shall be simple in construction and operation and inexpensive to manufacture.

An illustrative embodiment of the present invention is shown in the accompanying drawings in which:

Figure 1 is a perspective view of the sling device of my invention.

Fig. 2 is a side elevation showing the tree, mover and sling just prior to loading the tree on the mover.

Fig. 3 is similar to Fig. 2, but shows the tree loaded on the mover.

Fig. 4 is a rear view of the rootball and mover taken on the line 4—4 of Fig. 3.

Fig. 5 is a perspective view of the loaded mover taken from the front end.

Fig. 6 is a perspective view taken diagonally from the rear of the loaded mover shown in Fig. 5.

The tree mover shown in the drawings comprises a V-shaped chassis or tower 1 secured rigidly at its broad end to the rear axle 2 which is carried by the rear traction wheels 3, a bunk 1' set on the axle end of tower 1, a reach 4 hinged to axle 2, a front axle 5, traction wheels 6 and a coupler yoke or tongue 7 which is attachable at its forward end to a truck or tractor, not shown, said tongue 7 being hinged to said axle 5 as at 5' and said axle having a coupling pin 4' to connect said reach 4.

The apparatus I employ to raise the tree 8 and its ball 9 from the ground and place it on the mover comprises a self-adjusting sling or system of flexible lift members including an adjustable chain loop or belt 10, fitted within the periphery of the tree ball 9 and adjacent the bottom edge thereof, a series of slip members or chains 12—13—14—15 looped upwardly from points of spaced lateral slip connection to the belt 10, a pair of slip cables 16—17 each connected at their ends to a slip member or chains 12—14 and 13—15 respectively by hooks 18. The cables 16—17 are arranged in the snatch blocks 19—20 respectively for travel therein. The snatch blocks 19—20 are anchored to the clevis 24 at the top of tower 21 through cables 22—23 respectively.

To remove a tree from the ground and place it on the mover, I first dig the usual trench 25 around rootball 9 and bind the usual canvas or burlap covering around the side of the ball and somewhat under it. I next place the mover adjacent the tree in the lower tilted position as shown in Fig. 2. Next, I place my system of lift members (Fig. 1) in position on the ball, and adjust the belt 10 to the position as shown in Figs. 4 and 5. Next, I adjust the chains 12, 13, 14 and 15 until they are taut. The slip members or chains 12—13—14—15 which are looped around the chain belt 10 provide for a sidewise or slipwise movement for a self-equalizing adjustment of the chains of the sling when tension is applied thereto.

I next attach one end of the power cable 26 to the clevis 27 secured to collar 28 located on the bunk 1' adjacent the tree bearing end thereof. The power cable extends in a direction which is to the left as viewed in Fig. 3 of the drawings and bears in the cable guide 29 (see my copending application, Ser. No. 291,195, filed August 21, 1939, for Tree movers) and extends to a power or hand winch mounted on the truck or tractor, neither of which is shown in the drawings, and which is positioned at a short distance away from the mover. I then lock the wheels 3.

Next I attach the chain or block and tackle equipment 30. This tension means is employed to maintain the tree trunk in substantially parallel relationship with the plane of the lower bars 31 of the tower 1. Tackle 30 is held taut by the overbalancing weight of ball 9.

At this stage the tree is ready to be removed from the ground and loaded on the mover. Wherefore, tension is now applied to the cable 26 through the tractor or winch, not shown, causing the trunk of the tree to swing over with the tower and seat itself on the bunk and thus withdrawing the ball of the tree away from the ground. Further application of tension to the cable 26 will bring the tree and mover to the position shown in Fig. 3.

I have found from using this equipment that this lifting action is so gentle that the chains will not unduly "mash in" the soft earth forming the ball around the tree roots and I attribute this to the fact that the self-adjusting feature of my hook-up prevents unequal strain to be exerted on any one of the chains, because the bottom chain belt shifts somewhat to equalize the strain immediately. This is because the cables 16—17 are free to travel in the blocks 19—20 respectively.

The mover is then drawn away from trench 25 in the manner disclosed in my copending application, Ser. No. 291,195 filed August 21, 1939, for Tree movers. The mover is then assembled, ready for travel, by utilizing the prop equipment and front axle swivel coupler disclosed in my copending application, Serial No. 313,948, filed January 15, 1940.

As a safety measure I employ supplementary chains 32—33 (see Fig. 6) each anchored at one end to clevis 24 and at their other end to the uppermost chains 14—15 respectively at the point where they are engaged by the hooks 18. I have found that it is sometimes desirable or necessary to employ this safety measure especially in transit and when travelling up steep hills. If the hill is steep enough to shift the weight of the tree sufficiently towards the back or rear and thereby cause the front wheels 6 to be slightly withdrawn from the ground, the position of the rootball might be readily shifted and the cables 16—17 will have a tendency to travel in the snatch blocks 19—20, therefore, the safety chains 32—33 anchored as they are, will keep the ball from shifting its position by preventing the cables 16—17 from travelling in the blocks 19—20 even under the severest strain.

I also find it is well to employ some additional safety means other than the adjustable prop 34 and its chain cradle 35 just forward of the rootball to insure positive seating and retention of the tree on the bunk 1'. In selecting the chain for the belt 10 I employ one of such length as to have sufficient left over after I have properly adjusted the belt to rootball 9, to form a loop 36.

I then adjust chain 37, anchored at one end medially of and to the loop 36 and at the other end to clevis 38, until it is taut. This means of supplemental anchorage also insures constant retention of the rootball against the plate 39 of the prop apparatus 34.

It will now be apparent from this disclosure that I have eliminated the necessity of drilling holes in the rootball and installing the eye rods or bolts which are required to be bolted on heavy steel plates located at the bottom of the ball. Ordinarily by using this old method it took from one and one-half to two and one-half hours to prepare a tree for loading on a mover. It ordinarily requires from thirty minutes to an hour and a quarter to install the eye rods alone. By utilizing my present invention I have found that it now takes less than thirty minutes to completely prepare the tree and ball and load the same on the mover. It is, therefore, apparent that a great saving in time is effected.

I have also found that heretofore it has been practically impossible to move a tree which has been growing in sandy soil or in soil which has a high percentage of sand. I have discovered, however, from actual practice that by using my apparatus I can readily move trees growing in sandy soil. I have actually moved a tree that was growing in soil running 70% sand without encountering any difficulty whatsoever.

It is to be understood that some of the details set forth may be altered or omitted without departing from the spirit of the invention as defined by the appended claims.

I claim:

1. In a tree transplanter of the tilting chassis and bunk type, a horizontal belt arranged to bear upwardly against the outer part of the bottom of the rootball, and a self-adjusting system of flexible lift members dependable from the upright chassis and adapted and arranged jointly to embrace the rootball and to engage said belt distributively about its periphery, said belt being adjustable to provide different sized ball-engaging loops.

2. In a tree transplanter of the tilting chassis and bunk type, a self-adjusting system of flexible lift members dependable from the upright chassis and adapted and arranged to embrace the rootball, said lift members including an adjustable belt to underlie and bear upwardly against the edge part of the rootball, a plurality of slip-chains looped upwardly from said belt, a pair of cables looped upwardly from the loops of corresponding pairs of slip-chains, and a plurality of cables depending from the upended chassis and having their lower ends connected slipwise to the loops of said first mentioned cables respectively.

3. In a tree transplanter of the tilting chassis and bunk type, a self-adjusting system of flexible lift members dependable from the upright chassis and adapted and arranged to embrace the rootball, said lift members including an adjustable belt disposed on the bottom of the rootball, the circumference of said belt being smaller than the circumference of said rootball, a plurality of slip-chains looped upwardly from said belt, a pair of cables looped upwardly from the loops of corresponding pairs of slip-chains, a plurality of cables depending from the upended chassis and having their lower ends engaged slip-wise in the loops of said first mentioned cables respectively by means of suitable blocks, and a pair of safety chains, one disposed fore and the other aft of said rootball and each connected at one end thereto and at the other end to the frame of said mover.

4. A tree mover comprising a tilting tower chassis having a bunk thereon to receive the tree trunk, in combination with a system of coactive flexible lift members suspending a horizontal belt part arranged for suspension from the peak of the chassis and adapted for mutual slipwise adjustment whereby equalized distributed embracement and lift on the peripheral part of the rootball may be had incident to downward tilt of said chassis.

5. A tree mover of the class described comprising a front running gear, a combined tilting tower-chassis and bunk connectible rearwardly thereto, in combination with a lifting sling secured to the apex-top of the chassis, a root-ball brace and flexible safety means, said sling comprising a network adapted to embrace and reach somewhat under the rootball and including upward lift connections capable of sidewise slip for self equalizing adjustment, said brace being fitted to bear rearwardly against the rootball and forwardly against said front running gear substantially, and said safety means including an element disposed in tension from said apex-top to the upper side of the loaded rootball and also an element disposed in tension from the upper side of the rootball to said front running gear to oppose rear tilting of the rootball and to keep said brace in compression.

6. A tree-transplanting vehicular device comprising an elongated triangular chassis having a pair of tread wheels at its broad end on which it is tiltably mounted for upending against a tree to be moved and a sling to hang from the apex of said chassis when upended, which sling includes a flexible belt to underlie the outer edge part of the rootball and a series of flexible loops attachable at their ends to said belt distributedly thereon, and upwardly disposed flexible tension lift means by which the middle parts of said loops are detachably connectible to said apex, to embrace substantially uniformly the rootball and lift the tree to be moved.

7. A tree-transplanting vehicular device comprising an elongated triangular chassis having a pair of tread wheels mounted coaxialy at its broad end on which it is tiltably mounted for upending against a tree to be moved, a self-adjusting flexible sling to hang from the apex of said chassis when upended, and means to upend said chassis, which sling includes a belt to underlie the outer edge part of the tree rootball, a series of upward loops attachable at their lower ends to said belt distributedly thereon for jointly embracing the rootball, and upwardly disposed flexible tension lift means by which their upward midde parts are detachably connectible to said apex.

WALLACE L. JEFFREY.